UNITED STATES PATENT OFFICE.

THOMAS A. EDISON, OF LLEWELLYN PARK, ORANGE, NEW JERSEY, ASSIGNOR TO NORTH JERSEY PAINT COMPANY, OF STEWARTSVILLE, NEW JERSEY, A CORPORATION OF NEW JERSEY.

WATERPROOFING-PAINT FOR PORTLAND-CEMENT STRUCTURES.

No. 909,169.     Specification of Letters Patent.     Patented Jan. 12, 1909.

Application filed June 1, 1908. Serial No. 436,105.

*To all whom it may concern:*

Be it known that I, THOMAS ALVA EDISON, a citizen of the United States, residing at Llewellyn Park, Orange, county of Essex, and State of New Jersey, have invented a certain new and useful Waterproofing-Paint for Portland-Cement Structures, of which the following is a description.

My invention relates to an improved paint especially adapted for applications to dwellings or other structures of Portland cement which will be entirely waterproof and which will perfectly penetrate the pores of the cement surface, even when monolithic, so that the paint will be permanent.

In my application No. 14,575, filed February 6th, 1908, I have suggested the use of the petroleum residue known as "B. S.", which settles out of crude petroleum when stored in tanks and which is solid at ordinary temperatures, as a material from which to manufacture a paint for waterproofing cement surfaces, and have described a method of treatment of this material which gives good results.

The object of the present invention is to provide an improved waterproof paint for this purpose having superior waterproofing qualities, and an improved method of treatment for making the paint.

In the practice of my invention I take a suitable quantity of the residuum "B. S.", and dissolve it in a solvent. For the solvent, I preferably use warm petroleum benzin, although benzol or turpentine may be used. The material having been dissolved, it is allowed to cool and remain quiescent until the insoluble portion settles out or it may be filtered to obtain the same result. The clear solution is drawn off and used direct, or the solvent may be distilled off and recovered by condensation, until the residue has reached the proper consistency at which it may be most effectively applied as a paint.

The solid residue eliminated from the material has practically no waterproofing qualities, and its presence is objectionable since the solid insoluble particles interfere with the effective penetration of the waterproofing material into the pores of the cement or other surface and such solid particles also prevent the formation of continuous films of the waterproofing material, and to this extent the waterproofing character thereof is affected.

The paint so made is applied to cement walls, with a brush or otherwise, and the solvent carries the material some distance below the surface of the slightly porous cement, even in monolithic constructions. The solvent quickly evaporates and leaves the waterproofing agent in the pores and covering the exposed surface. In this condition the material when so applied is somewhat sticky, although not to the extent as when the solid residue is not removed, and when this stickiness is undesirable, as for example, would be the case in the interior of a house, I add to the solution a sufficient quantity of an oxidizable material, such as strongly boiled linseed oil, which is also soluble in the solvent used. Upon the evaporation of the solvent, the linseed oil in a short time oxidizes so as to neutralize the sticky qualities of the waterproofing paint without destroying its waterproofing and other desirable qualities.

It will, of course, be understood that various pigments and oil colors may be added to the solution in order to secure any desired tint.

For the treatment of a flat surface, as for example, the roof of a cement house, I carry the distillation of the solvent somewhat further, until the residue is of a pasty or semi-solid consistency when cold. To apply the paint so formed to a flat surface it is first melted to a thin liquid and applied hot to the surface. In this case the natural stickiness of the material can be neutralized by applying over it a fine powder, such as chalk, fine clay, or talc powder.

While I have particularly described my improved paint for use with cement structures, it will be understood that it may be employed upon or with other surfaces to make them waterproof, and that it may be also used in connection with fibrous materials, such as bags for containing cement or hygroscopic substances, for the purpose of excluding moisture therefrom.

Having now described my invention, what I claim as new is the following:

1. The method of making a waterproofing paint which consists of dissolving the petroleum residue known as "B. S." in a suitable solvent and removing the insoluble portion thereof, substantially as set forth.

2. The method of making a waterproofing paint which consists in dissolving the petroleum residue known as "B. S." in a suitable solvent, removing the insoluble portion, and distilling off a portion of the solvent, substantially as set forth.

3. The method of making a waterproofing paint which consists in dissolving the petroleum residue known as "B. S." in petroleum benzin and removing the insoluble portion, substantially as set forth.

4. The method of making a waterproofing paint which consists in dissolving the petroleum residue known as "B. S." in petroleum benzin, removing the insoluble portion and distilling off a portion of the solvent, substantially as set forth.

5. As a new article of manufacture, a waterproofing paint comprising a suitable solvent and that part of the petroleum residue known as "B. S." which is soluble therein, and free from the insoluble portion thereof, substantially as set forth.

6. As a new article of manufacture, a waterproofing paint comprising petroleum benzin and that portion of the petroleum residue known as "B. S." which is soluble therein, and free from the insoluble portion thereof, substantially as set forth.

7. A waterproofing paint comprising a suitable solvent and that portion of the petroleum residue known as "B. S." soluble therein, free from the insoluble portion thereof, and boiled linseed oil also dissolved in the solvent, substantially as set forth.

8. A waterproofing paint comprising petroleum benzin and that portion of the petroleum residue known as "B. S." soluble therein, and free from the insoluble portion thereof, and a colored pigment, substantially as set forth.

This specification signed and witnessed this 27th day of May 1908.

THOS. A. EDISON.

Witnesses:
FRANK L. DYER,
ANNA R. KLEHM.

It is hereby certified that in Letters Patent No. 909,169, granted January 12, 1909, upon the application of Thomas A. Edison, of Llewellyn Park, Orange, New Jersey, for an improvement in "Waterproofiing-Paint for Portland-Cement Structures," an error appears in the printed specifications requiring correction, as follows; In line 16, page 1, the number "14,575" should read *414,575;* and that the said Letters Patent should be read with this correction therein that the same may conform to the record of the case in the Patent Office.

Signed and sealed this 23rd day of February, A. D., 1909.

[SEAL.]
C. C. BILLINGS,
*Acting Commissioner of Patents.*